Oct. 25, 1966     J. G. BALLINGER     3,280,618
HUMIDITY SENSING APPARATUS
Filed Dec. 11, 1961
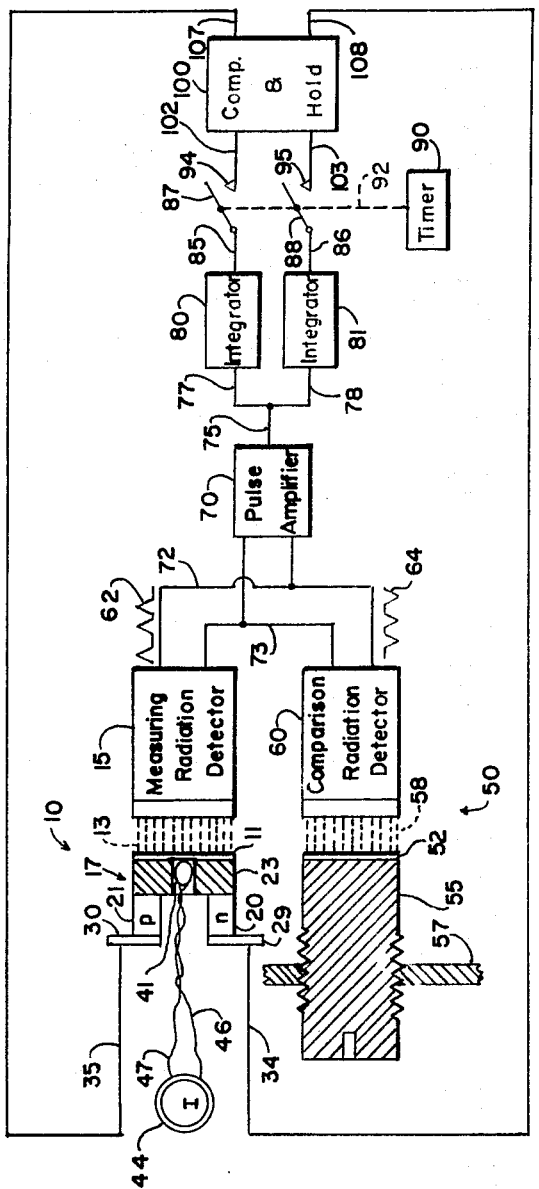
INVENTOR.
JOHN G. BALLINGER
BY Charles J. Ungemach
ATTORNEY

United States Patent Office 3,280,618
Patented Oct. 25, 1966

3,280,618
HUMIDITY SENSING APPARATUS
John G. Ballinger, Afton, Minn., assignor to Honeywell Inc., a corporation of Delaware
Filed Dec. 11, 1961, Ser. No. 158,356
2 Claims. (Cl. 73—17)

This invention is related to control apparatus and more particularly to humidity sensing devices or hygrometers. In the hygrometer art dew-point and frost point hygrometers have long been recognized as having certain advantages over other devices for measuring the humidity of the air. Some of these advantages include: the assurance of reliable data at both high and low temperatures; the requirement of considerably less precision in the measurement of temperatures than such devices as psychrometers for the same degree of accuracy in relative humidity; a rapid repsonse rate; the elimination of calibration except the setting of desired condensate film thickness; and a sensitivity which remains essentially constant at all dew-point temperatures. In spite of these advantages dew-point hygrometers have not received wide use since technical difficulties have been encountered. Until recently the cooling of the condensate surface presented a problem since it required the use of liquid refrigeration which was too bulky and expensive for a practical portable hygrometer. Recent dew-point hygrometers have been made which utilize the Peltier effect for cooling and heating, a typical example of which may be found in the O. J. Leone Patent 2,979,950. Such apparatus normally employs a polished mirror-like surface upon which moisture may collect at the dew-point temperature and a photoelectric sensing device which shines a beam of light onto the mirror-like surface and reflects it to a photoelectric detector. Depending upon the moisture which has collected on the mirror-like surface the reflected light will be diffused and an output from the photoelectric sensor is caused to operate a source of current which is connected to a Peltier cooling device located proximate to the mirror-like surface. Thus as the moisture collects on the mirror-like surface at the temperature indicative of the dew-point the current through the Peltier cooling device changes in such a direction as to allow the mirror-like surface to heat up at which time the collected moisture disappears. The photoelectric sensing device senses the disappearance of the moisture and again changes the current through the Peltier device to lower the temperature of the mirror-like surface until the condensate again appears. Thus the apparatus is cycled about the dew-point temperature or in the limit may be made to control at the dew-point temperature and auxiliary apparatus sensitive to this temperature is utilized to indicate the dew-point temperature and from this, knowing the air temperature, the relative humidity may be determined.

Even with the Peltier cooling device a number of disadvantages appear in such a system. For example it requires the use of a light source which can fail or fluctuate and which requires electrical power, it requires a reasonably polished surface which must be maintained as a mirror, a reasonably large area for condensation must be provided on the mirror, when comparison circuitry is used to compensate for light fluctuations the comparison photoresistor and the measuring photoresistor have to see the same light source in order that both see the same fluctuations in light output and must necessarily be a part of the sensing head, a lens system is usually required and the entire apparatus must be placed in a light-tight enclosure. It may also be said that differences between the light reflectivity from water condensate and frost condensate and changes in the reflectivity caused by erosion of the condensate layer by the passage of air over it may cause a device operating on the photoelectric principle to indicate dew-points or frost-points which are in error.

The present invention overcomes these problems by novel means for detecting the onset of condensation or ice formation on the thermoelectrically cooled condensate surface. More particularly the condensate surface is made radioactive as, for example, by attaching a metallic alpha or beta particle emitting foil to the thermoelectric cooler. The amount of radioactive emission is determined by the amount of moisture or frost collecting on the surface so that a radiation detector located proximate to the surface will produce an output indicative of the existence of moisture. That is to say, moisture which forms on the surface at the dew-point temperature will absorb some of the radioactive particles and the emission received by the radiation detector will therefore be reduced. Some of the advantages of this type of detection over the previous methods are as follows: the radioactive source output is independent of surface oxidation and the degree of surface polish; the sensing surface need not be flat; no lens system and no light shielding is required thus allowing free air circulation to the sensing surfaces; the condensate sensing surface may be very small thus improving the time constant; since the transmission of radioactive particles through the water layer depends upon the deposit density, it is not affected by difference in light reflection which may occur between crystals and water droplets; ionization caused by the radioactivity in the region of the detector acts to prevent a supersaturated atmosphere condition; when comparison circuitry is used it may be remotely located since a radioactive source has a constant output; and the sensor head may be reduced in size and weight.

The above advantages would apply equally well to the same device using the scattering or reflection of particles for an alpha or beta emitter from a remotely located source off the thermoelectric cooler to a radiation detector.

A more complete understanding of the invention will be obtained upon examination of the following specification and claims when read in connection with the figure which shows a schematic representation of an embodiment of the present invention.

Referring now to the figure a dew-point sensing head 10 is shown having a radioactive surface 11 thereon which is exposed to the atmosphere the humidity of which is to be measured. A number of dash lines 13 have been shown indicative of the radioactive emission from the surface 11 and this emission is sensed by a measuring radiation detector or scintillation counter 15.

In a manner similar to that shown in the Leone Patent 2,979,950, the surface 11 is temperature controlled by apparatus employing the Peltier effect. More particularly, a semiconducting device 17 consisting of end blocks 20 and 21 identified as n and p type elements respectively and a center block 23 is utilized. When direct current is applied between the end blocks 20 and 21 the center block 23 becomes a "cold" junction capable of reducing the temperature of plate 11 to a point where condensation will occur thereon. To this end the central block or "cold" junction 23 is placed proximate the condensate surface 11, or, if desired, the radioactive layer of material may be plated or sprayed onto the control block 23 itself. Or, block 23 may itself be the radioactive source. Direct current is supplied to the semiconducting device 17 by means of end terminals 29 and 30 connected to the end blocks 20 and 21 respectively. Terminals 29 and 30 may be copper or other heat conducting material so that these terminals may also act as a heat sink for carrying away excess heat from the apparatus. Terminals 29 and 30 are connected by conductors 34 and 35 respectively to a source of direct current which will be later described.

From the apparatus so far described it may be seen that as the atmosphere whose humidity is to be measured passes through the gap between the surface 11 and the radiation detector 15 a certain amount of moisture condenses on the surface 11 or frost, depending on the ambient temperature, which absorbs some of the radiation emitted from this surface. As soon as the moisture forms, the radiation detector's output decreases and apparatus which will later be described is put in motion to reduce or eliminate the cooling provided by the semiconducting device 17. When this happens the amount of moisture on the surface 11 decreases and the amount of radiation received by the radiation detector 15 increases. By reversing the direction of current through the Peltier cooler the process of decreasing the moisture is speeded up as heat is added to the block 23 the option of reversing the current need not, however, be used for proper operation. The rest of the circuit then operates to increase the cooling of the semiconducting device and thus the apparatus oscillates about the dew-point temperature or by limiting the cooling current may remain at the dew-point temperature in such a manner as to maintain a very small amount of moisture on the surface 11. The temperature of the surface 11 when this condition exists is termed the dew-point temperature and is indicative of relative humidity when used with the ambient air temperature. This temperature may be sensed in any standard manner and as shown in the figure a thermistor 41 is mounted within the cooling blocks 23 to sense the temperature by change of resistance. The resistance of the thermistor 41 is measured by an indicator 44 connected to thermistor 41 by conductors 46 and 47. The indicator 44 may be calibrated in terms of dew-point tempearture or apparatus may be provided to sense the ambient temperature and provide an output indicative of relative humidity.

Also shown in the figure is a comparison sensing head 50 which is used to provide a reference for the apparatus. More particularly, the comparison head comprises a radioactive surface 52 mounted on a movable member 55 shown in the figure to be screw threaded for movement relative to a housing shown at 57. Radiation from surface 52 has been shown in the figure as dash lines 58 and a comparison radiation detector or scintillation counter 60 has been shown receiving this radiation. The comparison radiation detector provides a constant output of magnitude determined by the distance between radiating surface 52 and the radiation detector 60. This distance is governed by the position of the screw-like member 55 in the housing 57 and is set at a value determined by the desired null point for the system. That is to say radiating surface 52 will be so placed with respect to the radiation detector 60 that the output from the comparison radiation detector 60 will be substantially equal and opposite to that from the measuring radiation detector 15 when the thickness or density of the condensate layer is at the predetermined value which it is desired to maintain.

As shown in the figure, the output from the measuring radiation detector 15 will be a random series of pulses shown as peaks 62 pointing generally upwards to show positive polarity while the output from comparison radiation detector 60 is a series of peaks 64 shown pointing generally downward to indicate negative polarity. The outputs from measuring radiation detector 15 and comparison radiation detector 60 are applied to a pulse amplifier 70 by means of conductors 72 and 73. Pulse amplifier 70 operates to amplify the pulses 62 and 64 and produce a corresponding output on conductor 75 which output is connected by conductors 77 and 78 to a pair of integrators 80 and 81. Integrators 80 and 81 operate to average the radiation of each polarity and produce outputs on conductors 85 and 86 indicative thereof. That is to say, the positive pulses 62 are combined in integrator 80 after being applied by amplifier 70 so as to produce an output on conductor 85 of magnitude indicative of the average radiation received by detector 15, while, in like manner, integrator 81 produces an output on conductor 86 of magnitude indicative of the average radiation received by the radiation detector 60. The output on conductor 85 will be of opposite polarity to the output on conductor 86. Conductors 85 and 86 are connected to a pair of switch arms 87 and 88 controlled by a timer 90 to which the switch arms are connected by a mechanical connection shown as dash line 92. Timer 90 operates through connection 92 to periodically engage switch arms 87 and 88 with switch contacts 94 and 95 respectively which contacts are in turn connected to a comparison and signal holding device 100 by conductors 102 and 103 respectively. The comparator and signal holding device 100 operates to compare the positive signal from conductor 85 with the negative signal from conductor 86 and to produce a resultant signal across its output connections 107 and 108 in accordance with any differential. If the positive signal on conductor 85 is larger than the negative signal on conductor 86, the comparator and signal holding device will produce an output which is fed to the semiconducting cooling device 17 by conductors 34 and 35 so as to cool surface 11 and increase the condensation thereon. This in turn decreases the amount of radiation received by the radiation detector 15 and the positive signal on conductor 85 decreases. This process continues until the positive signal on conductor 85 becomes smaller than the negative signal on conductor 86 at which time the comparator and signal holding device 100 operates to remove the signal from conductors 107 and 108 which in turn removes the current from the semiconducting cooling device 17 and the ambient temperature allows surface 11 to warm up.

By this process, the apparatus is continually oscillating around the dew-point temperature and the predetermined density of condensate on surface 11 is maintained.

Of course, if desired, the output of the comparator and signal holding device 100 could be made to reverse its output rather than shut it off when the positive signal on conductor 85 becomes smaller than the negative signal on conductor 86 in which case, the current through the semiconducing cooling device 17 would be reversed and the semiconducting device 17 would operate to heat the surface 11 and thereby increase the speed of response of the device.

Also, instead of merely turning the current on or off through the semiconducting device 17, the comparator and signal holding device 100 may be arranged to produce an output at all times, just sufficient in magnitude to hold the apparatus in a null condition, that is, where the condensate density on surface 11 was at the predetermined value and the current from the comparator and signal holding device 100 to the semiconducting device 17 was just enough to maintain it so. Then when the dew-point temperature changed, the output from the radiation detector 15 would change thus altering the signal on conductor 85 and causing the output of the comparator and signal holding device 100 to change in a direction such as to reestablish the original condensate density and produce a new equilibrium. Such apparatus would avoid the continuous cycling about the dew-point.

Timer 90 and switch arms 87 and 88 are employed so that integrators 80 and 81 will have time to integrate a fairly large number of pulses from measuring detector 15 and comparison detector 60 and produce outputs truly indicative of the average amount of radiation being received by these detectors. The detectors could also be saturated with radiation such that the current is measured and compared rather than the pulse rate. The comparator and signal holding device 100 in addition to comparing the signals on integrators 80 and 81 operates to maintain or hold these signals for a complete cycle so that the output on conductors 107 and 108 does not disappear when switch arms 87 and 88 are again disengaged from switch contacts 94 and 95 respectively.

It is thus seen that apparatus has been provided which is continually measuring dew-point temperature which in turn is a function of humidity. It is further seen that the apparatus employed produces many advantages over the prior art humidity indicating devices. It is obvious that a number of modifications may be made by those skilled in the art without departing from the spirit of the present invention as for example, the signal comparison network may take a variety of different forms, or the comparison detector omitted and an electrical balance used, the indicator may be set to indicate percent relative humidity rather than dew-point temperature by providing conventional additional apparatus, and the cooling device may obviously take other forms. I therefore do not intend to be limited by the specific disclosures used in connection with the preferred embodiment but I intend only to be limited by the following claims.

I claim:

1. Apparatus of the class described comprising, in combination: a first member having a radiation emitting surface exposed to the gas the humidity of which is to be measured;

Peltier cooling apparatus having an input and having a cold junction connected to the first member so as to cool the surface of said first member to substantially the dew-point temperature, the moisture which forms on the surface of said first member at the dew-point temperature operating to absorb a portion of the radiation emitted therefrom;

first radiation detecting means receiving the radiation from the surface of said first member and providing a pulsed output of a first sense indicative of the amount of radiation received;

a second member having a radiation emitting surface;

second radiation detecting means receiving the radiation from the surface of said second member and providing a pulsed output of a second sense opposite the first sense indicative of the amount of radiation received;

means mounting said second member for movement relative to said second radiation detecting means to establish a predetermined output from said second radiation detecting means;

first integrating means connected to receive the output of said first radiation detecting means and produce a signal output of the first sense and of magnitude indicative of the average amount of radiation received by said first radiation detecting means;

second integrating means connected to receive the output of said second radiation detecting means and produce a signal output of the second sense and of magnitude indicative of the average amount of radiation received by said second radiation detecting means;

comparison means having an input and producing an output in accordance with the difference in magnitude between the outputs of said first and second integrating means;

timing means including switch means operable to periodically connect the outputs from said first and second integrating means to the input of said comparison means;

means connecting the output of said comparison means to the input of said Peltier cooling apparatus to control the temperature of the cold junction thereof so that the temperature of the surface of said first member is maintained proximate the dew-point temperature;

and temperature responsive means mounted proximate the surface of said first member and operable to produce an output indicative of the dew-point temperature.

2. A dew-point hygrometer comprising, in combination: a first member exposed to the atmosphere the humidity of which is to be measured, said first member having a radioactive surface upon which moisture collects at a temperature which varies with the humidity and from which radioactive emission occurs to an extent dependent upon the amount of moisture thereon;

radiation detecting means operable to receive the radiation emitted from the surface of said first member and providing an output indicative of the amount of radiation received and thus indicative of the amount of moisture collected on the surface of said first member;

means controlling the temperature of the surface of said first member and thus controlling the amount of moisture which collects on the surface of said first member;

means connecting the output of said radiation detecting means to said means controlling the temperature of the surface of said first member so as to maintain a predetermined amount of moisture on the surface of said first member;

and means sensing the temperature of the surface of said first member so as to provide an output which varies with the humidity of the atmosphere.

References Cited by the Examiner

UNITED STATES PATENTS

| | | | |
|---|---|---|---|
| 1,285,920 | 11/1918 | Brown. | |
| 2,390,252 | 12/1945 | Hayward | 73–38 |
| 2,624,195 | 1/1953 | Van Alen | 73–17 |
| 2,725,486 | 11/1955 | Walstrom. | |
| 2,893,237 | 7/1959 | De Coriolis et al. | 73–17 |
| 2,920,485 | 1/1960 | Derganc | 73–355 |
| 2,971,461 | 2/1961 | Bradford et al. | 250–83.4 X |
| 2,979,950 | 4/1961 | Leone | 73–336.5 |
| 2,986,642 | 5/1961 | Schultz | 250–106 |
| 3,163,700 | 12/1964 | Williamson | 88–22.5 |

LEONARD FORMAN, *Primary Examiner.*

ISAAC LISANN, *Examiner.*

C. T. WOOD, W. D. MARTIN, *Assistant Examiners.*